United States Patent
Carpenter et al.

(10) Patent No.: US 9,047,714 B2
(45) Date of Patent: Jun. 2, 2015

(54) AUTOMATED PASSENGER SCREENING CHECKPOINT

(75) Inventors: Michael D. Carpenter, Arlington, TX (US); Stanley W. Sipe, Mansfield, TX (US); Floyd W. Worth, II, Richardson, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 570 days.

(21) Appl. No.: 13/188,525

(22) Filed: Jul. 22, 2011

(65) Prior Publication Data

US 2012/0228377 A1 Sep. 13, 2012

Related U.S. Application Data

(60) Provisional application No. 61/451,358, filed on Mar. 10, 2011.

(51) Int. Cl.
*G06K 5/00* (2006.01)
*G07C 9/00* (2006.01)
*G06Q 10/08* (2012.01)

(52) U.S. Cl.
CPC ............ *G07C 9/00087* (2013.01); *G06Q 10/08* (2013.01)

(58) Field of Classification Search
USPC ........................................................ 235/382
See application file for complete search history.

(56) References Cited

U.S. PATENT DOCUMENTS

| 7,193,515 | B1* | 3/2007 | Roberts et al. ............. 340/568.1 |
| 2005/0173284 | A1* | 8/2005 | Ambrefe, Jr. ............. 206/459.5 |
| 2007/0132580 | A1 | 6/2007 | Ambrefe, Jr. |

FOREIGN PATENT DOCUMENTS

DE 102009022716 A1 12/2010

OTHER PUBLICATIONS

PCT International Search Report mailed Aug. 21, 2012 corresponding to PCT Internationa Application No. PCT/US2012/027825 filed Mar. 6, 2012 (9 pages).

* cited by examiner

*Primary Examiner* — Rafferty Kelly (57) ABSTRACT

As automated screening system and method. A method includes receiving a personal identifier from an individual at an induction kiosk and issuing a scanning unit at the induction kiosk. The method includes associating the scanning unit with the personal identifier and inducting the scanning unit, including at least one item added by the individual, at the induction kiosk. The method includes conveying the scanning unit to an imaging device, and imaging the scanning unit and the item to produce a scanned image. The method includes receiving the personal identifier at a return kiosk and returning the scanning unit and the item to the individual based on the association between the scanning unit and the personal identifier.

20 Claims, 5 Drawing Sheets

AUTOMATED PASSENGER SCREENING CHECKPOINT

CROSS-REFERENCE TO RELATED APPLICATIONS

The present application is related to, and claims priority to U.S. Provisional Patent Application No. 61/451,358, filed Mar. 10, 2011, which is hereby incorporated by reference into the present application as if fully set forth herein.

TECHNICAL FIELD

The present disclosure is directed, in general, to individual and item screening for airports and other locations.

BACKGROUND OF THE DISCLOSURE

Improved and more efficient systems for screening individuals and items are desirable.

SUMMARY OF THE DISCLOSURE

Various disclosed embodiments include automated security screening systems and methods. A method includes receiving a personal identifier from an individual at an induction kiosk and issuing a scanning unit at the induction kiosk. The method includes associating the scanning unit with the personal identifier and inducting the scanning unit, including at least one item added by the individual, at the induction kiosk. The method includes conveying the scanning unit to an imaging device, and imaging the scanning unit and the item to produce a scanned image. The method includes receiving the personal identifier at a return kiosk and returning the scanning unit and the item to the individual based on the association between the scanning unit and the personal identifier.

A method can also include transmitting the scanned image, by an image management system, to one or more image review stations, and receiving an analysis result indicating that the scanning unit is cleared. The image management can communicate with a plurality of image review stations. In various embodiments, wherein the screening system also performs an automated analysis of the scanned image, the imaging is an x-ray radiography process, the scanning unit has a unique machine-readable identifier that is associated with the personal identifier, the unique identifier is one of a barcode and an RFID tag, and/or the personal identifier is received by reading a machine-readable personal identifier according to a personal ID. In various embodiments, reading the machine-readable personal identifier according to the personal ID includes one of scanning a barcode on a boarding pass, passport, driver license, or other document, reading a magnetic strip on a driver license, credit card, or other document, and receiving biometric input such as a fingerprint or an iris scan. In various embodiments, the screening system includes a plurality of induction kiosks operating in parallel, the screening system includes a plurality of return kiosks operating in parallel, and/or the system scans a unique machine-readable identifier of the scanning unit when the scanning unit is issued to the individual.

Other embodiments include an automated screening system that has a plurality of induction kiosks, each configured induct scanning units loaded with at least one item to be scanned from an individual, to scan a personal identifier of the individual, and to associate the personal identifier with the respective scanning units. The system includes an imager configured to image the loaded scanning units to produce a scanned image corresponding to each loaded scanning unit. The system includes a plurality of return kiosks, each configured to return the loaded scanning units to the individual and to scan the personal identifier of the individual. The system includes a conveyor system configured to convey the loaded scanning units from the induction kiosks, through the imager, and to return the scanning unit to the individual at the return kiosk that scanned the personal identifier associated with the respective scanning units.

In various embodiments, the system also includes an image management system configured to distribute each of the scanned images to one of a plurality of image review stations, and the image review stations can be remote from the automated screening system. The system can include a barcode reader at the induction kiosk configured to scan a personal ID to produce the personal identifier and/or a barcode reader at the induction kiosk configured to scan a barcode of each scanning unit. The conveyor system can prevent physical access to the scanning units between induction and return, and can ensure that the scanning unit and item are returned to the same individual that inducted them. The conveyor system can be configured to convey the screening unit to an exception area if the screening unit is not cleared for return to the individual.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Figure 1:
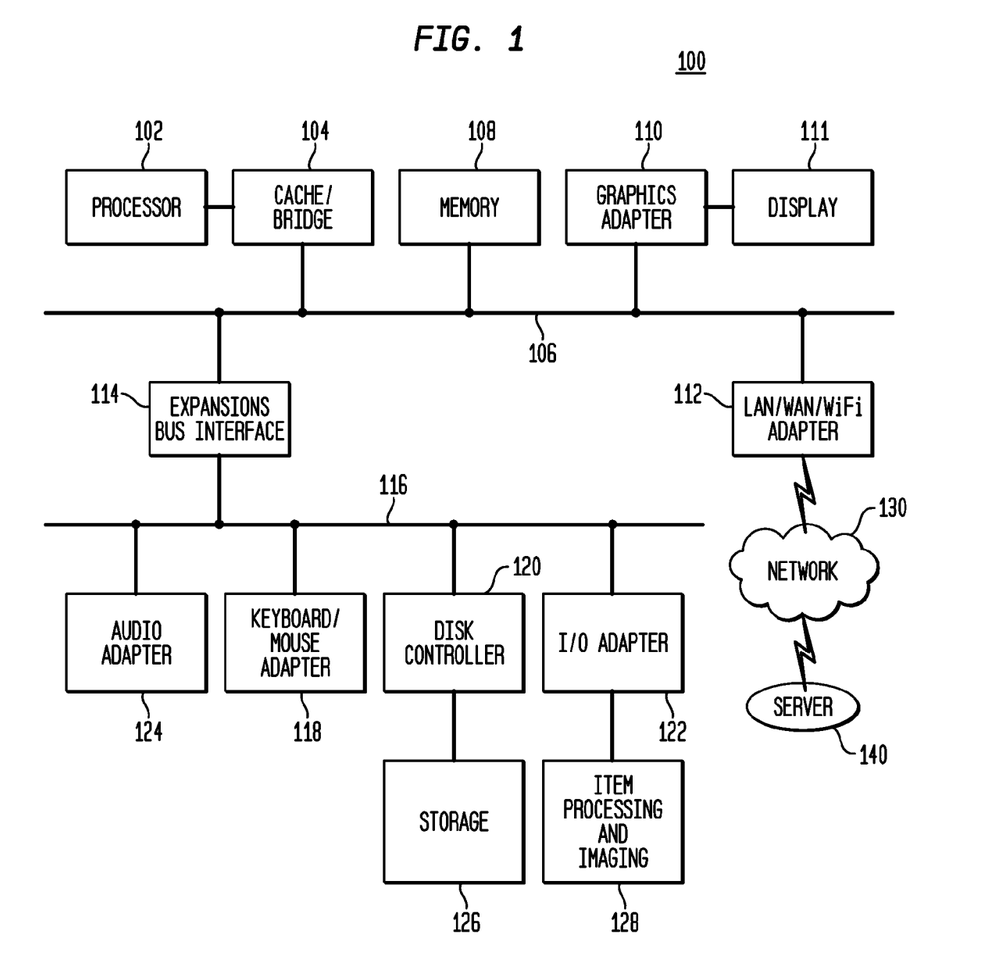
FIG. 1 depicts a block diagram of a data processing system in which an embodiment can be implemented.

Various embodiments include systems and methods for optimizing the screening rate for security screening points, using proven automation elements to break rigid first-in, first-out processing steps, thereby alleviating serial processing bottlenecks and establishing continuous flow. Such systems and methods are particularly useful in airport security screening points and other locations where a large number of people and their possessions must be screened for contraband and dangerous items. While particular embodiments herein are described in terms of airport screening, passengers, and carry-on items, the claims are not so limited unless specified, and can apply to any persons or items being screened as described in any other context, Passenger screening at security checkpoints is conducted using an array of process devices, including Advanced Imaging Technologies (AIT), AT X-ray, Explosive Trace Detectors and Electronic Metal Detectors (EMD). The processing devices at the screening checkpoint is optimized for specific screening functions, but the overall process within which they are used yields sub-optimal efficiency at the screening checkpoint, FIG. 1 depicts a block diagram of a data processing system 100 in which an embodiment can be implemented, for example as a control system for an automated screening system as described below, and can be configured to perform processes as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) Or digital versatile disks (DVDs), and other known optical, electrical, or magnetic storage devices.

I/O adapter 122 can be connected to item processing and imaging devices 128, as described herein, to image, scan, transport, label, address process, sort, and otherwise processes items in accordance with the various embodiments described herein.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft. Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet, LAN/WAN/Wireless adapter 112 can also communicate with packages as described herein, and perform other data processing system or server processes described herein. Data processing system 100 can communicate over network 130 with one or more server systems 140, which are also not part of data processing system 100, but can he implemented, for example, as separate data processing systems 100. A server system 140 can be, for example, a central server system at a central mail processing facility.

Figure 2:
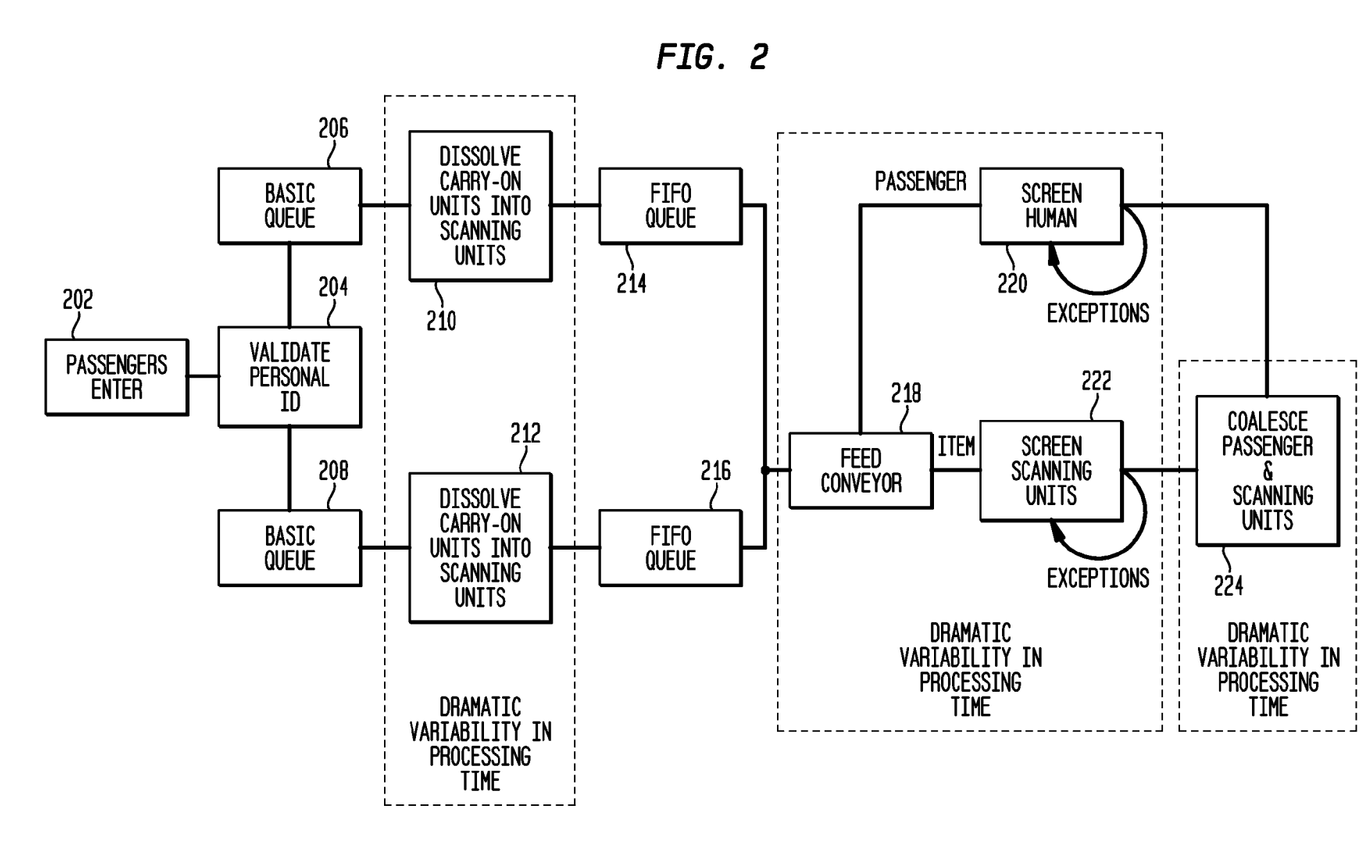
FIG. 2 illustrates a screening process that suffers from first-in, first-out (FIFO) bottlenecking.

FIG. 2 illustrates a screening process that suffers from first-in, first-out (FIFO) bottlenecking. The process in FIG. 2 is composed of sequential steps that are conducted on the passenger and the passenger's possessions, such as carry-on items. Through these sequential processing steps, the association between passengers and their possessions items is only maintained by physical proximity and sequence. In addition, many processing steps are conducted in a widely variable interval; in some instances they are conducted in a relatively short interval of time, in others, the processing time is very long.

In this example, the passengers enter at 202, and personal IDs are validated at 204. The passengers can separate into separate queues 206/208, though of course there could be a single queue or more than two queues. In each queue, the passengers dissolve their possessions, such as carry-on items, into the individual scanning units at 210/212. This can be, for example, putting carry-on items and shoes into scanning units. This process shows a dramatic variability in processing time, and each queue is limited to the speed of its slowest member.

The scanning units and passengers continue in queues at 214/216, until the scanning units are fed into a common feed conveyor at 218. The passengers are screened at 220, where exceptions for specific screening or pat-downs may take even longer. The scanning units are imaged and screened at 222, where exceptions may take much longer for more in-depth review or physical inspection. These processes also show a dramatic variability in processing time, and each queue is limited to the speed of its slowest member or inspection, since the scanning units and passengers are each in a FIFO queue.

Finally, the passengers and scanning units are coalesced at 224, for each passenger to reclaim his screened personal items. Again, this process can have a dramatic variability in processing time.

Dramatic variability in certain processing steps, coupled with mandatory first-in first-out (FIFO) processing means that the efficiency of entire processing chain is determined by the worst-case processing times for individual steps. In simple terms, everyone in line must wait for the people in front of them, and optimal processing situations may not circumvent sub optimal and exception cases. Disclosed embodiments eliminate batch processing by passenger, provide parallel processing in steps that experience dramatic variability in processing time, and maximize utilization of equipment and checkpoint processing rate.

Disclosed embodiments a material handling and IT automation architecture that provides a continuous flow process and a balanced, scalable system for screening passengers and carry-on luggage. This is accomplished by parallelizing processes that experience dramatically variable processing times. Processes affected by variableness include the passengers' breaking down their jewelry, clothing and carry-on units into scanning units, baggage viewing at the scanner, and the passenger's process of aggregating scanning units and accumulating organizing their belongings. EMD or AIT processes (passenger screening) may also benefit from parallelization, and the system architecture is designed to accommodate for this possibility.

Variableness in processing time and efficiency is caused by issues such as passenger unfamiliarity with the process, other human factors (stress, infirmity, children, etc.), complexity in the x-ray image, and the increase in the quantity of carry-on items. Processes affected by variableness in processing time are parallelized in disclosed embodiments, adding parallel stages as required to overcome the rate at which long processing intervals occur. The maximum number of duplicate processes for a single processing line can be determined by the maximum processing rate for the x-ray scanning device, not including on screen resolution, which is also parallelized through an image management system. Various embodiments are therefore x-ray imager-centric; this process device has the highest potential throughput in the system, and other system process elements can be scaled to provide balance.

In some embodiments, each item is placed in a "scanning unit", which can be a tray, bin, or similar carrier, and each scanning unit can have a unique identifier. In an airport example, parallelized processes can be enabled by explicitly identifying each scanning unit containing luggage, shoes, etc.) with a barcode or other identifier, and associating a passenger's scanning unit(s) with the passenger by means of the barcoded boarding pass or other person-specific identifier. Scanning units include unique identifiers, and are used for every item being processed by the system and scanned. Scanning units would provide important material handling interfaces to ensure that nearly all scanning items, from pocket change to high heeled shoes, can be handled automatically and reliably. Scanning units are sized to accommodate the typical carry-on luggage or other item, such as a "rollerboard", laptop, coat, or other personal effects. Larger items, such as infant strollers, walkers, very large umbrellas, and wheelchairs could be handled as exceptions, in which case they would not be processed through the automated system.

Various embodiments can use different types of identifiers for the persons and scanning units. Persons can be identified preferably by using machine-readable identification, such as a boarding pass barcode, a barcode, magnetic stripe, or radio-frequency identification (RFID) tag on a government-issued identification, credit card, or other such item, or even by using biometric scanning of fingerprints, iris patterns, or other physical features. All of these will be referred to herein as a "personal ID" that is associated with an individual person or passenger. The scanning units are similarly preferably identified using machine-readable identification, including barcodes, RFID tags, or other such identifiers.

Figure 3:
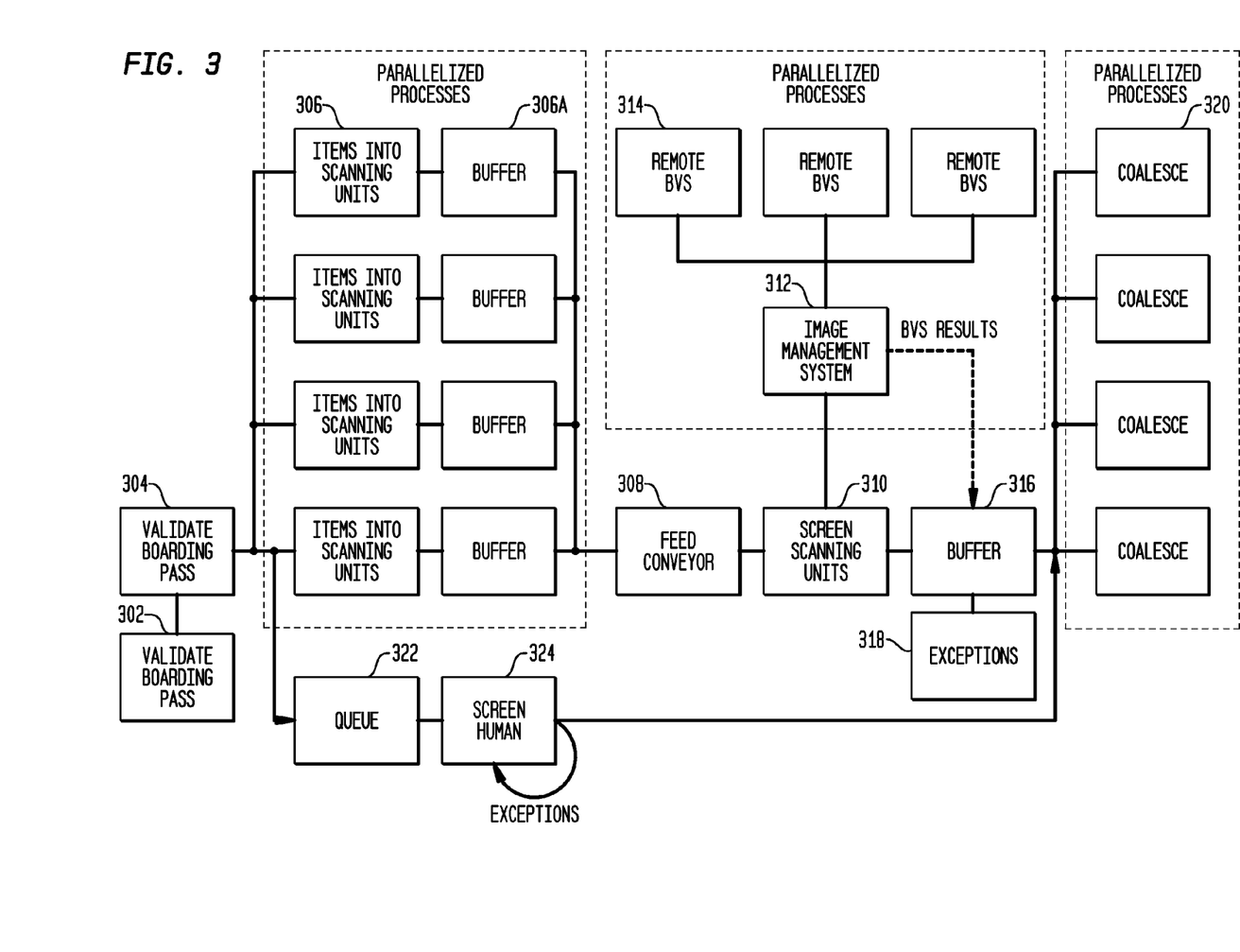
FIG. 3 illustrates a process flow in accordance with disclosed embodiments.

FIG. 3 illustrates a process flow accordance with disclosed embodiments, including parallelization of highly variable processes to balances throughput and enable continuous flow.

In this example, the passengers enter at 302, and personal IDs are validated at 304. The passengers can separate into separate induction kiosks at 306; preferably there are enough kiosks so that the queue after ID validation at 304 206/208 is minimized. In each kiosk, the passengers dissolve their possessions, such as carry-on items, into the individual scanning units. This can be, for example, putting carry-on items and shoes into scanning units. In various embodiments, the kiosk automatically issues another scanning unit to the passenger each time the passenger scans his personal ID, and the system then associates the personal ID with each of the issued scanning units, so that the scanning units and the passenger possessions are always associated with the specific passenger. The scanning units, loaded with any items to be scanned, are loaded back into the kiosk at 306, and may be temporarily held at buffers 306A as they are inserted onto the feed conveyor at 308.

In such a process, the induction of the items at the kiosks at 306 is highly parallelized, and so no one passenger acts as a bottleneck to the process. In particular embodiments, because a first scanning unit (and contents) must be placed into the conveyor system before a second scanning unit is issued to a passenger, the first scanning unit can be securely moved through the scanning process even while the passenger is still filling the second scanning unit.

The scanning units proceed along the feed conveyor at 308 and are screened at 310. In various embodiments, the x-ray, radiography, computerized tomography, or other scan is performed on each scanning unit, and the image is sent to an image management unit at 312. The image management distributes the images to multiple baggage viewing stations (BVSs). The BVSs can be local or remote, and preferably there are enough of them that the images can be reviewed and classified without ever significantly stopping the flow of the scanning units on the feed conveyor. The image management system collects the BVS results from the BVSs as the scanning units are moving from the screening at 310 to a buffer area at 316. The BVS data may be received after some processing latency, and buffering of the physical items being screened can be used to allow continuous flow during this delay. According to the results, any scanning units that hold items that require further investigation are marked as exceptions and kicked from the standard flow at 318. Similarly, any other scanning units associated with the same passenger can also be diverted to the exception processing.

In such a process, the scanning is performed at a relatively high rate, so that the scanning units and their contents can continue moving along the feed conveyor. The BVSs act in parallel to review and clear the images, avoiding any bottleneck caused by a single scanning unit. "Clearing" an image or scanning unit, as used herein, means determining that no threat is identified.

At the same time the scanning units are being screened, the passengers queue at 322 for a human screening at 324, in standard fashion. The passengers proceed to the plurality of return kiosks at 320. The passenger scans his personal ID at a return kiosk, and the system delivers his associated scanning units from the buffer area 316, so that the passengers and their belongings are again coalesced at the return kiosks at 320. Since the scanning units are under the control of the system from being inserted at the induction kiosk until re-delivery to the passenger at the return kiosk, and only after scanning of the associated personal ID, the scanning units and their contents are protect from theft or tampering by other persons.

Again, by using multiple return kiosks in parallel, the coalesce process is highly parallelized, and is not subject to a bottleneck caused by any single passenger or item.

In various embodiments, the system handles the provision and distribution of scanning units automatically, which reduces the labor required to handle the scanning units and reduces the number of scanning units required. Since scanning units are associated with a passenger by means of the personal ID, it can be advantageous to ensure that scanning units are carefully assigned to specific individuals. For this reason, the system can provide one scanning unit for each scanning of the personal ID and the area provided to the passenger to load a scanning unit will only accommodate one scanning unit. At the induction kiosk, the passenger will scan the personal ID, the scanning unit will be provided, the scanning unit will be inducted, and the passenger will scan the personal ID again for another scanning unit, if needed. When the passenger is finished, and leaves the area, the system will flag an error if all the specific scanning units provided to the passenger have not all been re-inducted. Using this method prevents a passenger from placing their property in another passenger's scanning units. Scanning units are inducted along a single line that feeds the x-ray imager.

In various embodiments, induction occurs by a mechanism and layout that denies other passengers from having access to scanning units inducted upstream, such as by moving the scanning units directly from the induction kiosk onto a secured transport conveyor that cannot be accessed by other passengers. Once inducted, scanning units are handled in a completely automated, secure environment from scanning to distribution, The x-ray process device itself has the potential to be the highest throughput process device in the system. The processing rate of the x-ray process device is currently throttled by On Screen Resolution (OSR) process by which a single operator examines the x-ray radiograph of each "bin" to screen for potential threats. The operators are today assigned to x-ray devices, one operator per x-ray device, despite the fact that the x-ray device has the potential to process at a higher throughput than the single OSR operator.

In various embodiments, multiple BVS operators can serve a single x-ray process or other imaging device by splitting the functionality included in the device between radiography and OSR functions, and providing an image management system in between. The benefit to this architecture lies in the maximized utilization of the imaging devices, the radically improved productivity of the OSR operators, and the space in the checkpoint that can be claimed when the OSR operators are pooled remotely. That is, images from the radiography scanner are distributed to multiple operators working in parallel, either locally or remotely, so that total number of images can be processed at a much higher rate.

The Digital Imaging and Communications in Security (DICOS) Standard for Airport Security and Baggage (DICOS v0.1) specifies interoperability for computed tomography (CT) images and x-ray radiographs in security screening. BVSs performing the OSR function through the DICOS interface can connect to the x-ray or CT device through an image management system, which controls workflow, load-leveling, failover, and archive functions. Various embodiments can use the DICOS interface, but it is not required for all implementations.

Results from OSR create two distinct categories of scanning units that have completed the process: those screened against potential threat, and those not screened against potential threat (including those for which screening was incomplete or failed). A fixed point downstream of the x-ray process device represents the point in the process when all items not categorized as screened against potential threat must be regarded as not screened. All items that have been categorized as not screened against potential threat by this point are directed to exception handling, while screened items are directed to an return kiosk.

The passenger, having completed inducting items at the induction kiosk is queued for screening at an enhanced metal detector (EMD) or Advanced Imaging Technology (AIT) process device, or other similar passenger screening device, including a physical search or pat-down. This is another process that experiences significant variability in processing rate, and as such, is subject to parallelization in the architecture. The passenger scans their personal ID immediately prior to proceeding through process device. Exceptions are dealt with as today; otherwise, the system directs the passenger to one of multiple return kiosks, where their property will he held securely for collection.

At the return kiosk, the passenger scans their personal ID. If the personal ID matches the owner of the items which are being collected at the kiosk, the passenger is informed of how many items are in process or in queue at the return kiosk, and the passenger is given access to the first of the scanning units. The return kiosk features a folding jump-seat to facilitate passengers as they perform such tasks as putting on shoes and organizing their belongings. As the passenger unloads each tray, the empty scanning units are returned at a chute. The empty scanning units is read, disassociated from the passenger's personal ID, and automatically circulated to an induction kiosk. As the empty scanning unit is disassociated from the passenger, the next tray is provided to the passenger, and so forth, until all the trays have been unloaded. At this point, a visible cue is given to the passenger, and the return kiosk is disassociated from the passenger.

Figure 4:
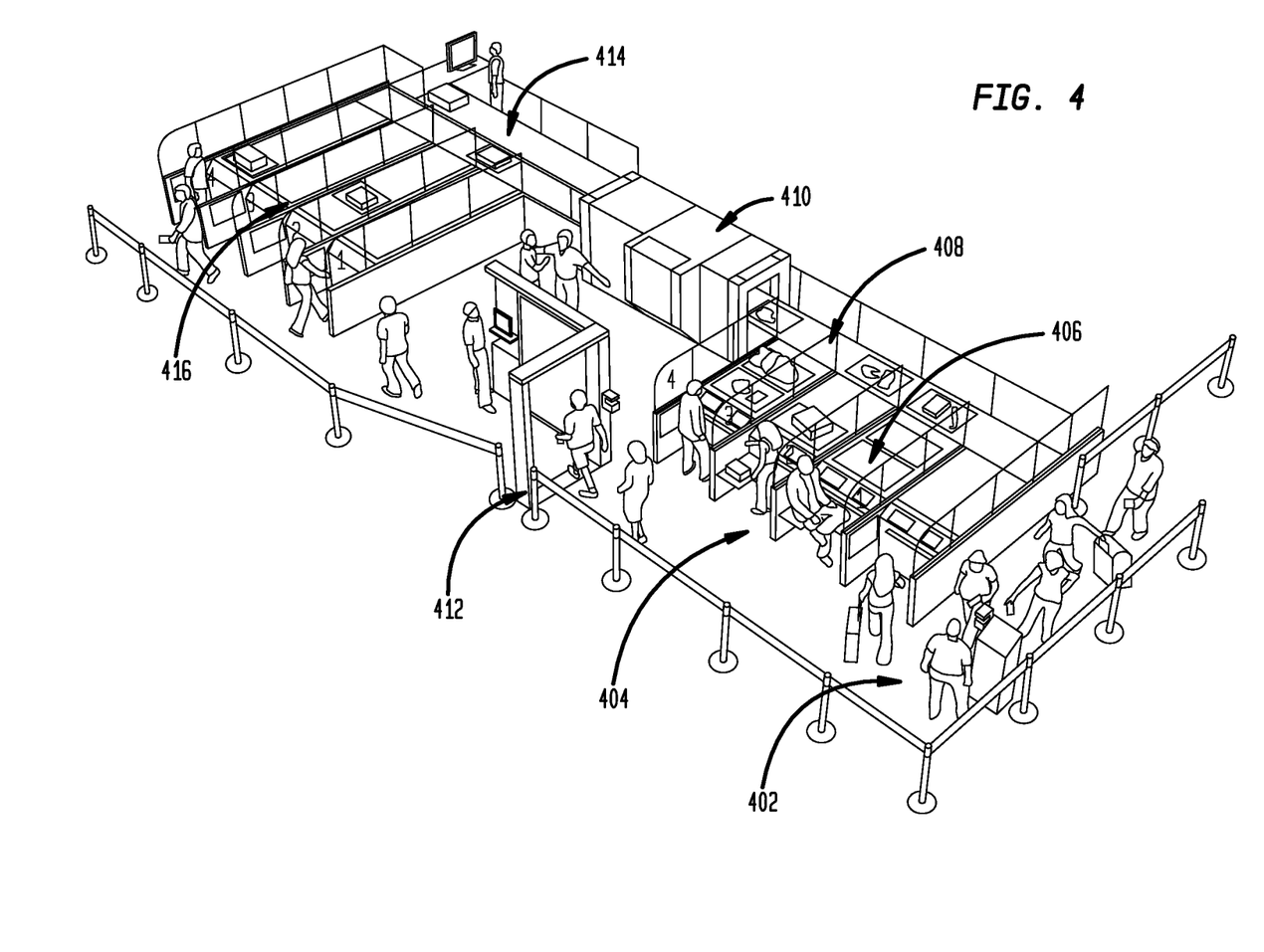
FIG. 4 illustrates an example of a screening system in accordance with disclosed embodiments.

FIG. 4 illustrates an example of a screening system in accordance with disclosed embodiments.

In this example, the passengers or other individuals enter at queue 402, and proceed to an available induction kiosk 404, where they scan their personal IDs. The individual's items are placed in or on scanning units 406, and then are automatically moved onto conveyor system 408. As described herein, the scanning units are inducted into the system in parallel, and each scanning unit and its contents is associated with a specific individual based on the personal ID.

The induction kiosk can include a barcode reader, an RFID tag reader, a magnetic stripe reader, a fingerprint reader, an iris scanner, or other such hardware as appropriate for scanning the personal IDs and/or the scanning units.

The scanning units are conveyed through and scanned by imager 410; these images are sent to a pool of local or remote BVSs. At the same time, the individuals can move through the human screening device 412. Once cleared, the scanning units move to a buffer along conveyor 414 before return to the individuals.

Once the individuals have been screened, they move to a return kiosk 416, and again scan their personal IDs. The system returns their associated scanning units at this point.

Figure 5:
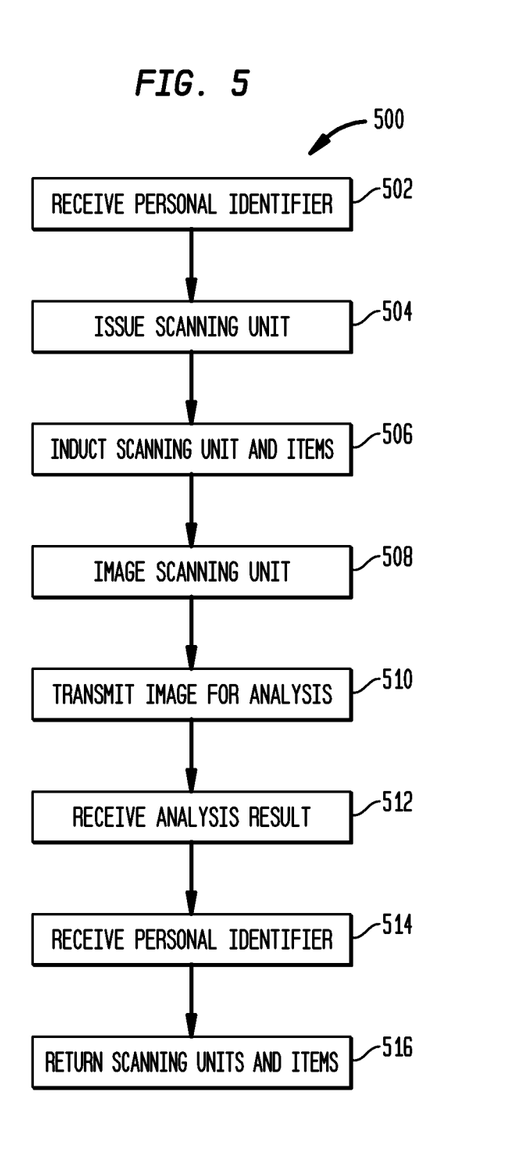
FIG. 5 depicts a flowchart of a process 500 in accordance with disclosed embodiments, as may be performed by an automated screening system as described herein.

FIG. 5 depicts a flowchart of a process 500 in accordance with disclosed embodiments, as may be performed by an automated screening system as described herein. The screening system includes one or more data processing, systems 100, along with other imaging, screening, conveying, and other hardware as described herein.

The system receives a personal identifier (step 502), preferably at an induction kiosk. Receiving, as used herein, can include loading from storage, receiving from another process or system, receiving from an interaction with a user, and otherwise. In particular, receiving here can include reading a machine-readable personal identifier according to a personal ID as used herein, whether that be scanning a barcode on a boarding pass, passport, driver license, or other document, reading a magnetic strip on a driver license, credit card, or other document, receiving biometric input such as a fingerprint or an iris scan, or other means of determining a personal identifier that uniquely identifies an individual for purposes of the screening processes described herein, The system issues a scanning unit to the individual (step 504), which can include associating the scanning unit (or a unique identifier of the scanning unit) with the personal identifier. This step can also include scanning or reading the scanning unit by the kiosk to determine its unique identifier.

The system inducts the scanning unit, including at least one item added by the individual (step 506). Steps 502-506 may be repeated if the individual requires additional scanning units for additional items, and are typically performed in parallel at several induction kiosks for different individuals. In particular embodiments, an additional scanning unit is not issued until any currently-issued scanning unit has been inducted.

The system conveys the scanning unit and any contents to an imaging device (step 506). This step may include temporarily holding the scanning unit in a buffer area, and may include performing this step as steps 502-506 are repeated for other scanning units.

The system images the scanning unit and the item(s) (step 508) to produce a scanned image. This can be, for example, an x-ray radiography, computerized tomography, or other scan. Other scanning functions may also be performed, such as scanning for chemical and explosive residue.

The system transmits the scanned image for analysis (step 510). In various embodiments, this includes receiving the image in an image management system, which transmits it for display at an image review station such as a BVS. In some embodiments, there are multiple image review stations, local or remote, working in parallel to enable operators to review images as soon as possible so that there is no slowdown, and the image management system is in communication with each of these to efficiently distribute the images.

The system receives an analysis result (step 512). If the analysis result indicates that the scanning unit is not cleared, then the unit is moved to an exception area for further review. If the analysis result indicates that the scanning unit is cleared, it proceeds on the conveyor to the return kiosks. This step can also include any automated analysis of the scanned image or other aspects of the scanning unit or its contents, and the results of any automated analysis are included in the analysis result.

The system again receives the personal identifier (step 514), as described above, this time at a return kiosk. By having the passenger re-scan his personal ID, the system ensures that the scanning units are returned to the same person.

The system returns any cleared scanning units, along with any contents, that are associated with the personal identifier (step 516). In this step, the system can also receive the emptied scanning units, and de-associate the unique identifiers of the returned scanning units from the personal identifier. The scanning units can then be conveyed by the system back to the induction kiosks to repeat the process. As part of this step, in some cases, the system can return only one cleared scanning unit at a time, and only return the next scanning unit to the individual after the individual has re-inserted the previous emptied scanning unit.

Those skilled in the art will recognize that, for simplicity and clarity, the full structure and operation of all systems suitable for use with the present disclosure is not being depicted or described herein. Instead, only so much of the physical systems as is unique to the present disclosure or necessary for an understanding of the present disclosure is depicted and described. The remainder of the construction and operation of the systems disclosed herein may conform to any of the various current implementations and practices known in the art.

The various steps of the processes described herein may be omitted, repeated, performed concurrently, sequentially, or in a different order, or combined with other disclosed processes, unless specifically claimed otherwise. Similarly, various features of various embodiments described herein may be combined in different embodiments or omitted from specific embodiments as may be described by the claims appended hereto.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs). In particular, computer readable mediums can include transitory and non-transitory mediums, unless otherwise limited in the claims appended hereto.

Although an exemplary embodiment of the present disclosure has been described in detail, those skilled in the art will understand that various changes, substitutions, variations, and improvements disclosed herein may be made without departing from the spirit and scope of the disclosure in its broadest form, None of the description in the present application should be read as implying that any particular element, step, or function is an essential element which must he included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method performed by an automated screening system, comprising:
   receiving a personal identifier from an individual at an induction kiosk by the automated screening system;
   issuing a scanning unit at the induction kiosk by the automated screening system;
   associating the scanning unit with the personal identifier by the automated screening system;
   inducting the scanning unit, including at least one item added by the individual, at the induction kiosk by the automated screening system;
   conveying the scanning unit to an imaging device by the automated screening system;
   imaging the scanning unit and the item by the automated screening system to produce a scanned image;
   receiving the personal identifier at a return kiosk by the automated screening system; and
   returning the scanning unit and the item to the individual, by the automated screening system, based on the association between the scanning unit and the personal identifier.

2. The method of claim 1, further comprising:
   transmitting the scanned image, by an image management system, to an image review station, the image management communicating with a plurality of image review stations; and
   receiving an analysis result indicating that the scanning unit is cleared.

3. The method of claim 2, wherein the screening system also performs an automated analysis of the scanned image.

4. The method of claim 1, wherein the imaging is an x-ray radiography process.

5. The method of claim 1, wherein the scanning unit has a unique machine-readable identifier that is associated with the personal identifier.

6. The method of claim 5, wherein the unique identifier is one of a barcode and an RFID tag.

7. The method of claim 1, wherein the personal identifier is received by reading a machine-readable personal identifier according to a personal ID.

8. The method of claim 1, wherein reading the machine-readable personal identifier according to the personal ID includes one of scanning a barcode on a boarding pass, passport, driver license, or other document, reading a magnetic strip on a driver license, credit card, or other document, and receiving biometric input such as a fingerprint or an iris scan.

9. The method of claim 1, wherein the screening system includes a plurality of induction kiosks operating in parallel.

10. The method of claim 1, wherein the screening system includes a plurality of return kiosks operating in parallel.

11. The method of claim 1, further comprising scanning a unique machine-readable identifier of the scanning unit when the scanning unit is issued to the individual.

12. An automated screening system, comprising:
    a plurality of induction kiosks, each configured to induct scanning units loaded with at least one item to be scanned from an individual, to scan a personal identifier of the individual, and to associate the personal identifier with the respective scanning units;
    an imager configured to image the loaded scanning units to produce a scanned image corresponding to each loaded scanning unit;
    a plurality of return kiosks, each configured to return the loaded scanning units to the individual and to scan the personal identifier of the individual; and
    a conveyor system configured to convey the loaded scanning units from the induction kiosks, through the imager, and to return the scanning unit to the individual at the return kiosk that scanned the personal identifier associated with the respective scanning units.

13. The automated screening system of claim 12, further comprising an image management system configured to distribute each of the scanned images to one of a plurality of image review stations.

14. The automated screening system of claim 13, wherein the image review stations are remote from the automated screening system.

15. The automated screening system of claim 12, further comprising a barcode reader at the induction kiosk configured to scan a personal ID to produce the personal identifier.

16. The automated screening system of claim 12, further comprising a barcode reader at the induction kiosk configured to scan a barcode of each scanning unit.

17. The automated screening system of claim 12, wherein the conveyor system prevents physical access to the scanning units between induction and return.

18. The automated screening system of claim 12, wherein the automatic screening system ensures that the scanning unit and item are returned to the same individual that inducted them.

19. The automated screening system of claim 12, wherein the conveyor system is also configured to convey the screening unit to an exception area if the screening unit is not cleared for return to the individual.

20. The automated screening system of claim 12, wherein each induction kiosk is also configured to issue respective scanning units.

* * * * *